US012618941B2

(12) United States Patent
Bao et al.

(10) Patent No.: US 12,618,941 B2
(45) Date of Patent: May 5, 2026

(54) METHOD, SYSTEM AND STORAGE MEDIUM FOR MODEL PREDICTIVE AUTOMATIC GAIN CONTROL OF SATELLITE TRANSPONDER UNDER ADDITIVE WHITE GAUSSIAN NOISE JAMMING

(71) Applicant: Intelligent Fusion Technology, Inc., Germantown, MD (US)

(72) Inventors: Yajie Bao, Germantown, MD (US); Peng Cheng, Germantown, MD (US); Khanh Pham, Kirtland AFB, NM (US); Erik Blasch, Arlington, VA (US); Dan Shen, Germantown, MD (US); Xin Tian, Germantown, MD (US); Genshe Chen, Germantown, MD (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 396 days.

(21) Appl. No.: 18/467,794

(22) Filed: Sep. 15, 2023

(65) Prior Publication Data

US 2025/0093462 A1    Mar. 20, 2025

(51) Int. Cl.
*G01S 7/34* (2006.01)
*G01S 7/36* (2006.01)

(52) U.S. Cl.
CPC . *G01S 7/34* (2013.01); *G01S 7/36* (2013.01)

(58) Field of Classification Search
CPC .............. G01S 7/34; G01S 7/36; G01S 19/21
See application file for complete search history.

(56) References Cited

U.S. PATENT DOCUMENTS 7,912,158 B2 * 3/2011 Cahn .................... H03G 3/3089
                                                         375/147
2009/0004990 A1 * 1/2009 Renard ................ H03G 3/3078
                                                         455/296

(Continued)

FOREIGN PATENT DOCUMENTS

CN          115841031 A   *   3/2023

OTHER PUBLICATIONS

U.S. Appl. No. 18/467,794, filed Nov. 17, 2025_CN_115841031_A_M.pdf, machine translation of CN-115841031-A (Year: 2023).*

(Continued)

*Primary Examiner* — William Kelleher
*Assistant Examiner* — Kenneth W Good
(74) *Attorney, Agent, or Firm* — ANOVA LAW GROUP, PLLC

(57)          ABSTRACT

The present disclosure provides a method for model predictive automatic gain control under additive white Gaussian noise jamming. The method includes predicting a plurality of consecutive signal values by an autoregressive integrated moving average model; calculating a signal average value of the plurality of consecutive signal values; calculating a gain control value using the signal average value of the plurality of consecutive signal values; if the gain control value is greater than a maximum control capability of a AGC processor, using the gain control value as a desired gain control value; or if the gain control value is equal to or less than the maximum control capability, using a minimum difference between an estimated amplitude and each of reference amplitudes in the LUT as the desired gain control value; and calculating a new AGC gain for a current time step according to the desired gain control value.

20 Claims, 6 Drawing Sheets

(56) References Cited

U.S. PATENT DOCUMENTS

2022/0209805 A1 *  6/2022  Yu ........................ H04B 1/0007
2024/0098655 A1 *  3/2024  Shanbhag Kota ...........................
                                              H04W 52/0245

OTHER PUBLICATIONS

Jun-Hee Jang et al., "A Fast Automatic Gain Control Scheme for Initial Cell Search in 3GPP LTE TDD System", School of Information and Communication Engineering, Sungkyunkwan University, Korea.

* cited by examiner

METHOD, SYSTEM AND STORAGE MEDIUM FOR MODEL PREDICTIVE AUTOMATIC GAIN CONTROL OF SATELLITE TRANSPONDER UNDER ADDITIVE WHITE GAUSSIAN NOISE JAMMING

GOVERNMENT RIGHTS

The present disclosure was made with Government support under Contract No. FA9453-21-C-0556, awarded by the United States Air Force Research Laboratory. The U.S. Government has certain rights in the present disclosure.

FIELD OF THE DISCLOSURE

The present disclosure generally relates to the field of satellite communication technology and, more particularly, relates to a method, a system and a storage medium for model predictive automatic gain control of a satellite transponder under additive white Gaussian noise (AWGN) jamming.

BACKGROUND

Automatic gain control (AGC) is a closed-loop-feedback regulating circuit used in the satellite transponder to maintain a suitable signal amplitude at output, despite signal amplitude variations at input. The control performance of AGC affects the efficiency of satellite communications (SATCOM) by playing a part in both the quantization error of the analog-to-digital converter (ADC) and the signal distortion of the high-power amplifier (HPA).

Satellite jamming has been considered a growing threat; and different approaches for satellite communication jamming mitigation such as game theory, frequency hopping, wave selection, power allocation, systems-level analysis and the like have been developed. The anti-jamming approaches may increase the variations of the signal amplitude. For frequency hopping, the signal carrier frequency rapidly hops among various distinct frequencies occupying a wide spectral band, which may add uncertainty of amplitude fluctuations caused by jamming signals to channel noise. However, existing AGC schemes determine the gain control values based on current signal amplitude tracking errors, which may not respond fast enough to rapid signal amplitude variations. Therefore, there is a need to provide a transponder's front-end AGC that is capable of fast response to rapid amplitude variations.

BRIEF SUMMARY OF THE DISCLOSURE

One aspect of the present disclosure provides a method for model predictive automatic gain control of a satellite transponder under additive white Gaussian noise jamming. The method includes predicting a plurality of consecutive signal values by an autoregressive integrated moving average (ARIMA) model using data collected by an antenna receiver in the satellite transponder; calculating a signal average value of the plurality of consecutive signal values; calculating a gain control value using the signal average value of the plurality of consecutive signal values through a model predictive controller; if the gain control value is greater than a maximum control capability of the AGC, using the gain control value as a desired gain control value, where the maximum control capability is predefined in a lookup table (LUT); or if the gain control value is equal to or less than the maximum control capability, using a minimum difference between an estimated amplitude and each of reference amplitudes in the LUT as the desired gain control value; and calculating a new AGC gain for a current time step according to the desired gain control value and a corresponding AGC gain for a previous time step.

Another aspect of the present disclosure provides a system. The system includes a memory, configured to store program instructions for performing a method for model predictive automatic gain control of a satellite transponder under additive white Gaussian noise jamming; and a processor, coupled with the memory and, when executing the program instructions, configured for: predicting a plurality of consecutive signal values by an autoregressive integrated moving average (ARIMA) model using data collected by an antenna receiver in the satellite transponder; calculating a signal average value of the plurality of consecutive signal values; calculating a gain control value using the signal average value of the plurality of consecutive signal values through a model predictive controller; if the gain control value is greater than a maximum control capability of the AGC, using the gain control value as a desired gain control value, where the maximum control capability is predefined in a lookup table (LUT); or if the gain control value is equal to or less than the maximum control capability, using a minimum difference between an estimated amplitude and each of reference amplitudes in the LUT as the desired gain control value; and calculating a new AGC gain for a current time step according to the desired gain control value and a corresponding AGC gain for a previous time step.

Another aspect of the present disclosure provides a non-transitory computer-readable storage medium, containing program instructions for, when being executed by a processor, performing a method for model predictive automatic gain control of a satellite transponder under additive white Gaussian noise jamming. The method includes predicting a plurality of consecutive signal values by an autoregressive integrated moving average (ARIMA) model using data collected by an antenna receiver in the satellite transponder; calculating a signal average value of the plurality of consecutive signal values; calculating a gain control value using the signal average value of the plurality of consecutive signal values through a model predictive controller; if the gain control value is greater than a maximum control capability of the AGC, using the gain control value as a desired gain control value, where the maximum control capability is predefined in a lookup table (LUT); or if the gain control value is equal to or less than the maximum control capability, using a minimum difference between an estimated amplitude and each of reference amplitudes in the LUT as the desired gain control value; and calculating a new AGC gain for a current time step according to the desired gain control value and a corresponding AGC gain for a previous time step.

Other aspects of the present disclosure may be understood by those skilled in the art in light of the description, the claims, and the drawings of the present disclosure.

BRIEF DESCRIPTION OF THE DRAWINGS

The accompanying drawings, which are incorporated into a part of the specification, illustrate embodiments of the present disclosure and together with the description to explain the principles of the present disclosure.

DETAILED DESCRIPTION

References may be made in detail to exemplary embodiments of the disclosure, which may be illustrated in the accompanying drawings. Wherever possible, same reference numbers may be used throughout the accompanying drawings to refer to same or similar parts.

Reducing the response time of AGC for high signal amplitude variations has been considered in different contexts. An AGC scheme is developed based on the average amplitude ratio calculation for 3GPP (3rd Generation Partnership Project) LTE (Long Term Evolution) TDD (Time Division Duplex) system. In particular, the signal amplitude ratio (SAR) is used as the gain control value when the SAR is greater than the maximum control capacity of the conventional AGC. Using the SAR produced a fast response to the significant change of the average of the received sample signal normalized by AGC gain in adjacent blocks. Furthermore, a hybrid AGC approach that combines the SAR technique with the signal amplitude difference technique is developed and may be viewed as proportional control with time-varying gains for SATCOM systems. However, existing AGC schemes computed the gain control value to be applied for the current sample signal based on the tracking error at the previous time instant rather than anticipating future events and taking control actions accordingly, which may not provide satisfying control performance in future time instants. Instead, AGC under AWGN jamming is formulated as a stochastic model predictive control (MPC) problem to minimize the signal amplitude tracking error after applying the AGC gain; and a proportional-integral-derivative (PID)-based AGC approach that combines SAR and PID control is developed to employ the derivative term for anticipatory control without a process model. While simulations validated that PID-based AGC achieved better control performance than SAR-based AGC (SAR-AGC), the lack of a process model may limit performance improvement. In the present disclosure, an MPC-based AGC (MPC-AGC) is developed to reduce the response time.

MPC has been a control approach to employ a (time-varying) process model for anticipatory control actions and to handle constraints and uncertainties. Furthermore, learning-based MPC has been developed to use a model learned from data for control design when a system model is unavailable; and the model fidelity is critical to MPC performance. Various model families have been developed for data-driven modeling, such as neural networks and kernel methods. Increasing the model complexity may improve the model accuracy, but also increases the computational time of MPC. Considering the characteristics of the SATCOM and the limited computational resources in the satellite transponder, ARIMA is used to model the process for MPC, due to its excellent statistical properties and great flexibility.

Figure 1:
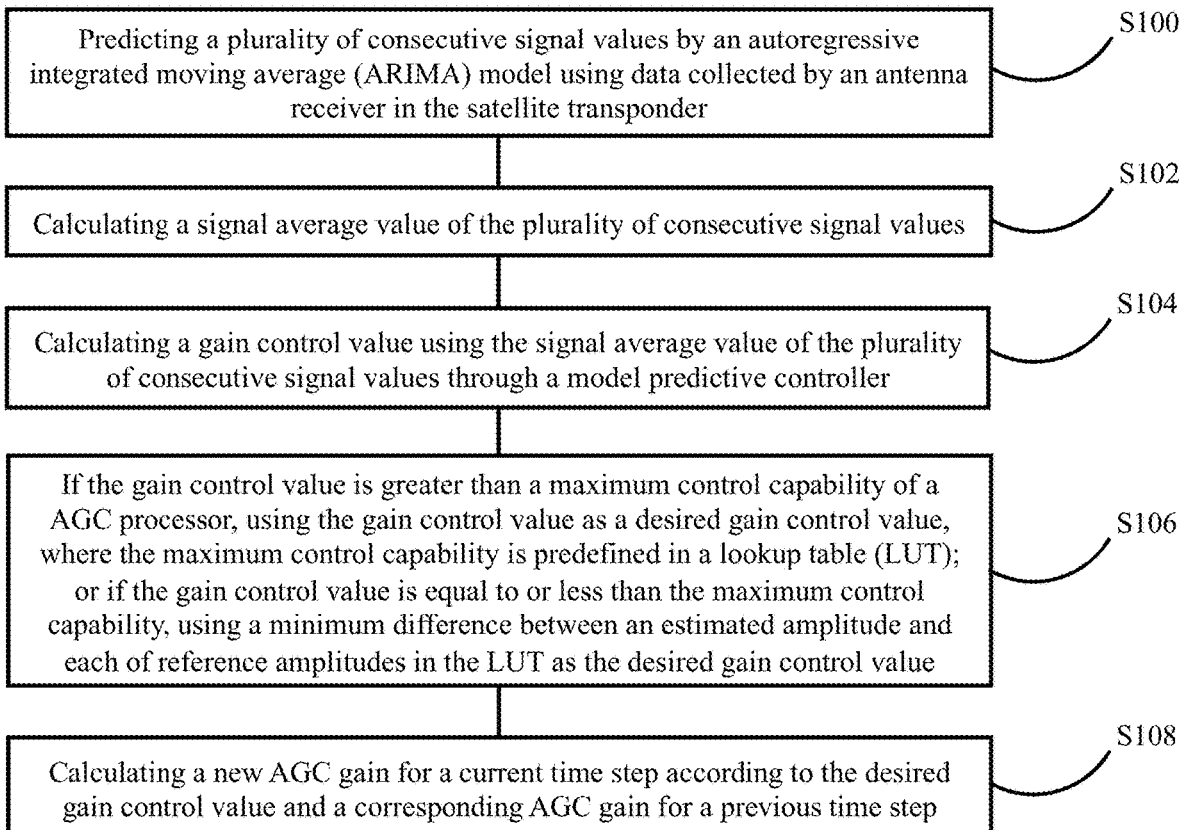
FIG. 1 depicts an exemplary method for model predictive automatic gain control of a satellite transponder under AWGN jamming according to various disclosed embodiments of the present disclosure.
Figure 2:
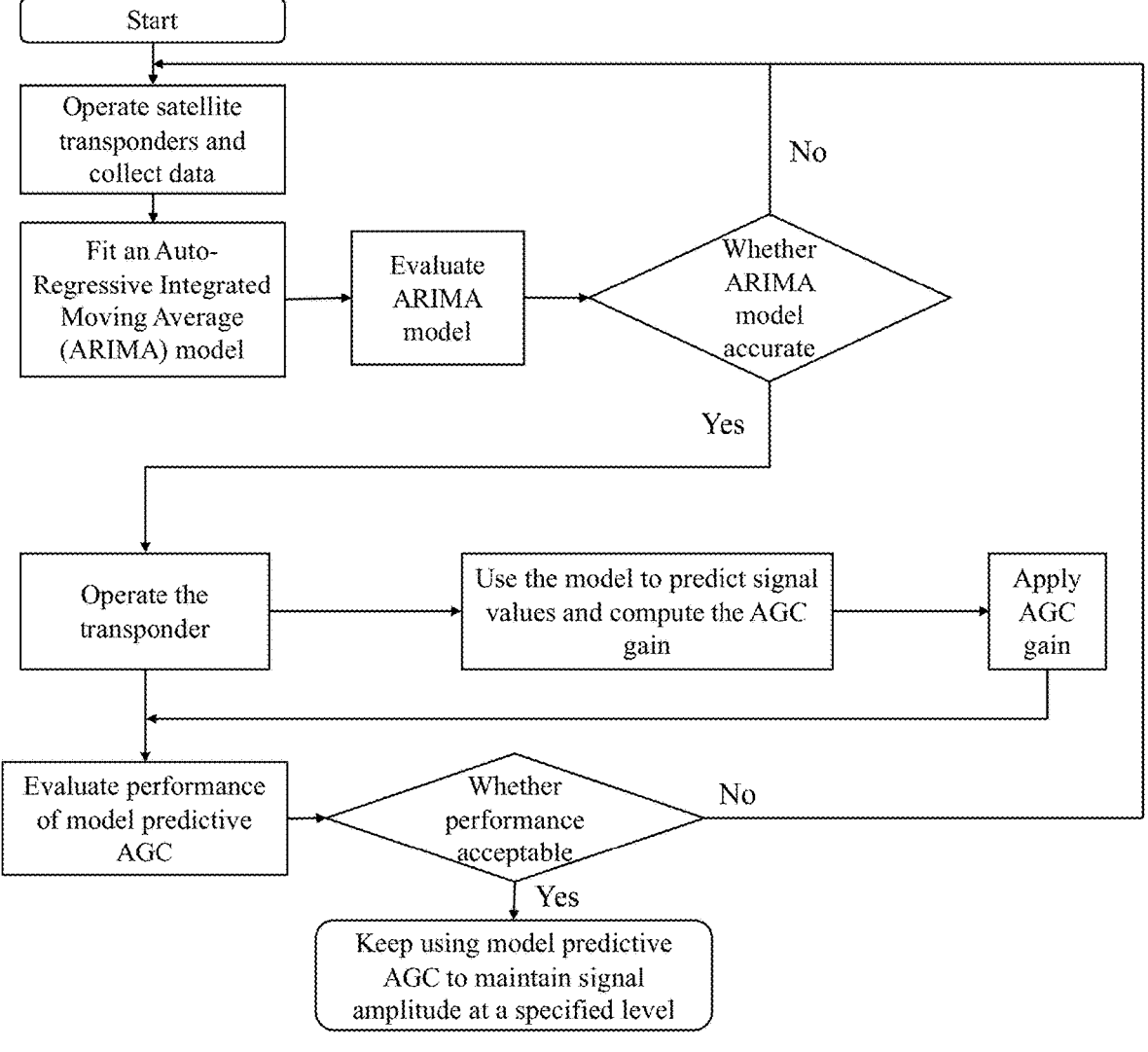
FIG. 2 depicts an exemplary flowchart for model predictive automatic gain control of a satellite transponder under AWGN jamming according to various disclosed embodiments of the present disclosure.

According to various embodiments of the present disclosure, a method for model predictive automatic gain control of a satellite transponder under AWGN jamming is described hereinafter. FIG. 1 depicts an exemplary method for model predictive automatic gain control of the satellite transponder under AWGN jamming according to various disclosed embodiments of the present disclosure. FIG. 2 depicts an exemplary flowchart for model predictive automatic gain control of the satellite transponder under AWGN jamming according to various disclosed embodiments of the present disclosure. In the present disclosure, the satellite transponder includes an AGC processor.

At S100, a plurality of consecutive signal values is predicted by an autoregressive integrated moving average (ARIMA) model using data collected by an antenna receiver in the satellite transponder.

At S102, a signal average value of the plurality of consecutive signal values is calculated.

At S104, a gain control value is calculated using the signal average value of the plurality of consecutive signal values through a model predictive controller.

At S106, if the gain control value is greater than a maximum control capability of the AGC processor, the gain control value is used as a desired gain control value, where the maximum control capability is predefined in a lookup table (LUT); or if the gain control value is equal to or less than the maximum control capability, a minimum difference between an estimated amplitude and each of reference amplitudes in the LUT is used as the desired gain control value.

At S108, a new AGC gain for a current time step is calculated according to the desired gain control value and a corresponding AGC gain for a previous time step.

In one embodiment, before predicting the plurality of consecutive signal values by the ARIMA model using the data collected by the antenna receiver in the satellite transponder, the method further includes evaluating accuracy of the ARIMA model by computing mean squared differences between the plurality of consecutive signal values predicted by the ARIMA model and corresponding real signal values. It should be noted that the closer to 0 the mean squared differences are, the more accurate the ARIMA model is.

In one embodiment, the method further includes after evaluating the accuracy of the ARIMA model, if the ARIMA model is accurate, predicting the plurality of consecutive signal values by the ARIMA model; and if the ARIMA model is not accurate, returning to collect new data by the antenna receiver in the satellite transponder.

In one embodiment, before evaluating the accuracy of the ARIMA model, the method further includes fitting the ARIMA model using the data collected by the antenna receiver in the satellite transponder.

In one embodiment, after calculating the new AGC gain for the current time step according to the desired gain control value and the corresponding AGC gain for the previous time step, the method further includes applying the new AGC gain for the current time step and evaluating performance of the model predictive AGC.

In one embodiment, the method further includes if the performance of the model predictive AGC is acceptable, keeping using the model predictive AGC to maintain a signal amplitude at a specified level; and if the performance of the model predictive automatic gain control (AGC) is not acceptable, returning to collect new data by the antenna receiver in the satellite transponder.

In one embodiment, after calculating the new AGC gain for the current time step, the new AGC gain is processed through a gain control amplifier (GCA).

Referring to FIGS. 1-2, in one embodiment, one or more satellite transponders under jamming may be operated, and data that represent the behaviors of the satellite transponders under possible jamming of interest may be collected. In one embodiment, the ARIMA model may be fitted to the data collected previously, and the accuracy of the ARIMA model may be evaluated. If the ARIMA model is not accurate, return to the step of operating one or more satellite transponders under jamming; and if the ARIMA model is accurate, the ARIMA model may be outputted. Next, the model predictive control (MPC) under jamming may be applied. The ARIMA model may be configured to predict the future signal values; the automatic gain control (AGC) gain may be computed online using the MPC based on the predictions; and the AGC gain calculated may be applied to the gain control amplifier. In one embodiment, the performance (i.e., the signal amplitude tracking errors) of the MPC-AGC model may be evaluated. If the performance is not acceptable, return to the step of operating one or more satellite transponders under jamming, otherwise, end the model predictive automatic gain control process.

The present disclosure considers AGC in the satellite transponder with rapid signal amplitude variations at its input due to anti-jamming technique. AGC may be configured to find a sequence of AGC gain values $$\{G_{m,n}^{AGC} | n = 1, \ldots, N\}$$

that minimize the signal amplitude tracking errors during the signal transmission, as shown in the following equation (1):

$$\min_{G_{m,1}^{AGC}, \ldots, G_{m,N}^{AGC}} \sum_{n=1}^{N} \mathbb{E}\left[\left|20\log_{10}\hat{A}_{m,n} - A_{des}\right| \middle| S_{m,n-1}\right] \tag{1}$$

where E denotes an expectation operator over random jamming signals and channel noise; |•| denotes an absolute value operator indicating mean absolute signal amplitude tracking error is configured to measure control performance; $\hat{A}_{m,n}$ denotes an estimated average amplitude at time instant n, where n=1, 2, . . . , N; and $A_{des}$ denotes a desired signal amplitude; $S_{m,n-1}=$ $\{s_{m,0}, \ldots, s_{m,n-1}\}$ denotes the sequence of all historic observations up till time instant n; and $s_{m,n}$ denotes a n-th time-domain sample of a m-th symbol.

Since future evolution of the jamming and noise is uncertain, a dynamic process model is needed to estimate the signal amplitude tracking errors in the future time instants. However, such dynamic process model is not available.

Therefore, in the present disclosure, the data-driven model predictive AGC scheme for anticipatory control is provided to improve control performance in terms of response time and overshoot/undershoot.

Figure 3:
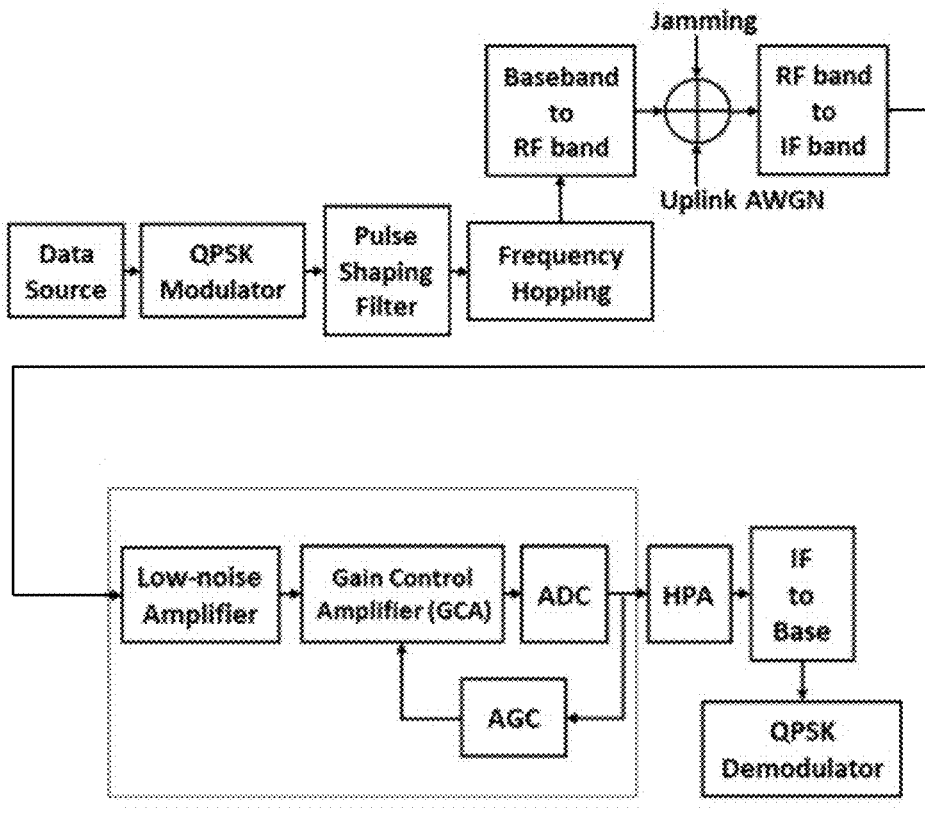
FIG. 3 depicts an exemplary structure of a simplified satellite transponder model according to various disclosed embodiments of the present disclosure.

According to various embodiment of the present disclosure, the system structure for model predictive automatic gain control of the satellite transponder under AWGN jamming is described herein. FIG. 3 depicts an exemplary structure of a simplified satellite transponder model according to various disclosed embodiments of the present disclosure. The transponder may convert uplink carrier frequencies to downlink carrier frequencies for information transmission. Additionally, signals in the transponder may be in an intermediate frequency (IF) band which is the shifted carrier as an intermediate step in transmission. It should be noted that the HPA in the transponder may cause nonlinear distortion to transmitted signals and normally operate at or close to its saturation point (i.e., the maximum output power capacity) to maximize power efficiency. AGC may control the gain of the gain controller amplifier (GCA) following the low-noise amplifier (LNA) to maintain a desired signal amplitude which may facilitate HPA to correct the phase shifts. In such way, the control performance may affect bit error rate (BER) performance.

The conventional AGC may compare the average amplitude $A_{m,n}$ with the desired amplitude $A_{des}$ to determine the gain control value. In particular, $A_{m,n}$ is estimated by following equation (2):

$$A_{m,n} = (1 - \lambda)A_{m,n-1} + \lambda\left|\hat{y}_{m,n}\right| \tag{2}$$

where $\hat{y}_{m,n}$ denotes a received sample signal of the m-th transmitted symbol at the n-th time instant after ADC operation; and $\lambda=2^{-L}$ with L denoting a tuning parameter that controls the trade-off between estimation complexity and performance. In one embodiment, the desired amplitude may be −3 dB relative to the saturation point of the HPA's input. Then, the conventional AGC may determine the gain control value as $S_{m,n}=S_{i*}$, where $S_{i*}=\min_i |A_{m,n}-A_{des,i}|$, and $A_{des,i}$ denotes the i-th reference amplitude from a discrete set of reference amplitudes in a predefined lookup table (LUT) with associated $S_i$. Increasing $S_i$ can decrease the response time for large input signal power variations, but also increase the variation of the output signal power level during the steady-state operation. Finally, the AGC gain $$G_{m,n}^{AGC}$$

may be calculated by following equation (3):

$$G_{m,n}^{AGC} = G_{m,n-1}^{AGC} + S_{m,n} \tag{3}$$

where both $$G_{m,n}^{AGC}$$

and $S_{m,n}$ are scalars; and the subscripts m and n denote the m-th symbol and n-th time instant.

Figure 4:
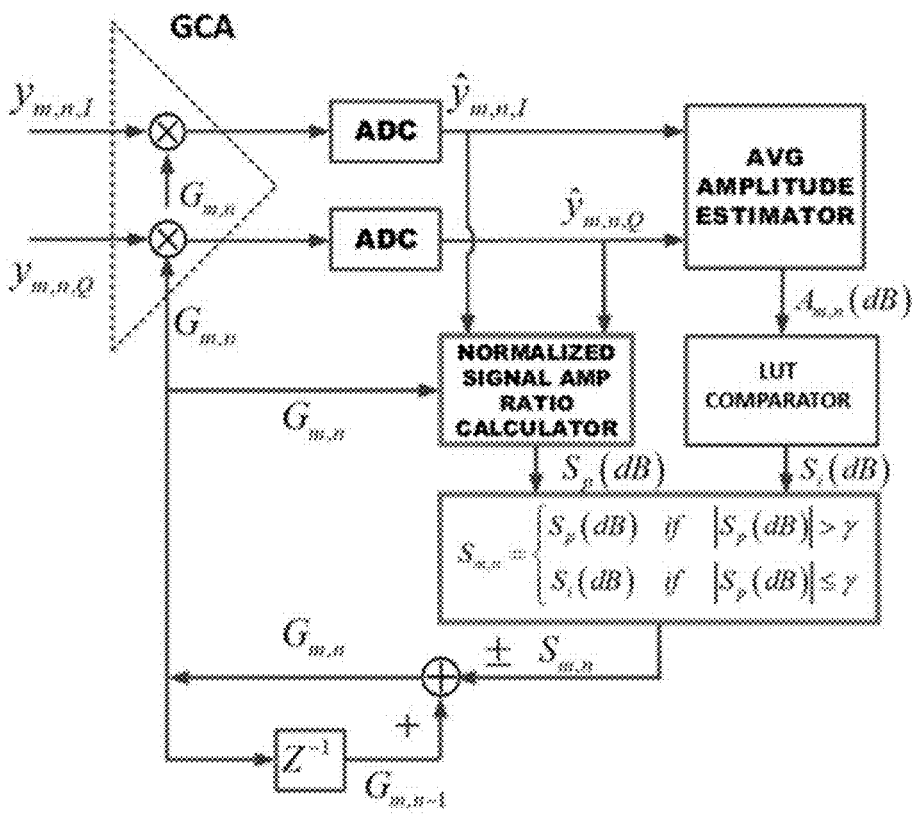
FIG. 4 depicts an exemplary feedback AGC block diagram according to various disclosed embodiments of the present disclosure.

The hybrid gamma parameter is developed to enhance performance of the conventional AGC in case of large signal-level difference but used a heuristic parameter-changing-point which may not be practical. Instead, a fast AGC scheme based on the SAR is developed to improve the response time while maintaining small variation of the output signal amplitude of the conventional AGC scheme. For example, the SAR may be defined as following equation (4):

$$S_p = \sum_{i=1}^{\beta} \left| \frac{\hat{y}_{m,n-\beta-i}}{G_{m,n-\beta-i}^{AGC}} \right| \Big/ \sum_{i=1}^{\beta} \left| \frac{\hat{y}_{m,n-i}}{G_{m,n-i}^{AGC}} \right| \qquad (4)$$

where $\beta=\lambda^{-1}=2^L$ denotes a block size. The division in equation (4) may be to avoid the effect of AGC on computing SAR. Then, the control law may be calculated as following equation (5):

$$S_{m,n} = \begin{cases} S_p, & |S_p| > \gamma \\ S_{i^*}, & |S_p| \le \gamma \end{cases} \qquad (5)$$

where $\gamma = \max_i(A_{des,i} - A_{des})$. In such way, a larger step size $S_p \ge S_{i^*}$ may be provided when the signal has larger amplitude fluctuation than the threshold $\gamma$ (maximum control capability of the conventional AGC). The overall AGC scheme is shown in FIG. 4. FIG. 4 depicts an exemplary feedback AGC block diagram according to various disclosed embodiments of the present disclosure. Additionally, the AGC parameters such as L and $S_i$ may be determined by trial and error using simulations.

Moreover, SAR and the signal amplitude tracking errors may be combined as the gain control value, which may be viewed as proportional control with time-varying gains. However, using proportional control alone may result in an error between the set point and the process value (e.g., offset), as the controller needs an error to generate the proportional output response. To overcome the limitations of existing AGC schemes, a PID-based AGC that used the derivative term of signal amplitude tracking errors for anticipatory control and the integral term in the PID control is developed to eliminate steady-state errors.

According to various embodiment of the present disclosure, the model predictive control is described herein. Model predictive control (MPC) is a widely used optimal control technique to control a process while satisfying process constraints. In particular, at each time step k, an MPC controller may calculate a sequence of control actions, where the control actions may minimize a cost function over a finite receding horizon by solving a constrained optimization problem that depends on current received/estimated system state and is subject to process dynamics, which may be formalized as following equations:

$$\min_{x(i|k),u(i|k)} \sum_{i=0}^{N-1} \ell(x(i\,|\,k),u(i\,|\,k)) + V(x_N) \qquad (6a)$$

$$\text{subject to } x(i+1\,|\,k) = f(x(i\,|\,k),u(i\,|\,k)) \qquad (6b)$$

$$x(i\,|\,k) \in X,\, u(i\,|\,k) \in \mathcal{U} \qquad (6c)$$

$$i = 0, \dots, N-1 \qquad (6d)$$

where N denotes a prediction horizon; $\ell$ and V denote stage and terminal costs, respectively; x denotes a state in the state constraint set $X \subseteq \mathbb{R}^{n_x}$; u denotes a control input in the input constraint set $\mathcal{U} \subseteq \mathbb{R}^{n_u}$; and f denotes a process dynamic model. The controller may then apply only the first computed control action u*(0|k), where u* denotes an optimal solution to equation (6a)-equation (6d), disregarding the following computed control actions. The process repeats in the next time instant k+1. Compared with the PID controller, the MPC controller takes less time to reach the set point under steady-state conditions, and the offsets may be smaller than the offsets of the PID controller. Overall, the MPC controller may exhibit desirable performance than the PID controller results.

The problem of maintaining a desired signal amplitude under AWGN jamming is formulated as a stochastic MPC problem as follows:

$$\min_{G_{m,n}^{AGC}} \mathbb{E}\left[ \left\| 20\log_{10}\hat{A}_{m,n} - A_{des} \right\|_p^p \big| S_{m,n-1} \right] \qquad (7a)$$

$$\text{subject to } \hat{A}_{m,n} = (1-\lambda)A_{m,n-1} + \lambda|\hat{y}_{m,n}| \qquad (7b)$$

$$\hat{y}_{m,n} = |s_{m,n}|10^{\frac{G^{LNA}+G^{GCA}+G_{m,n}^{AGC}}{20}} \qquad (7c)$$

$$s_{m,n} = \begin{cases} x_{m,n} + \omega_{m,n} + \upsilon_{m,n}, & \text{if } n \in I_{Jam} \\ x_{m,n} + \omega_{m,n}, & \text{otherwise} \end{cases} \qquad (7d)$$

$$0 \le G_{m,n}^{AGC} \le \overline{G}^{GCA} \qquad (7e)$$

where $\omega_{m,n}$ denotes a channel noise caused by multi-path fading and signal interference while $\upsilon_{m,n}$ represents a jamming signal with $I_{jam}$ denoting the set of time instants when jamming happens; $\underline{G}^{GCA}$ and $\overline{G}^{GCA}$ denote lower and upper bounds of the GCA gain, respectively. As shown by FIG. 3, gains may be processed through the low-noise amplifier $G^{LNA}$, the automatic gain control $G^{AGC}$, and the gain controller amplifier $G^{GCA}$. In an ideal case where $s_{m,n}$ is known, the optimal gain may be calculated as following equation (8):

$$G_{m,n}^{AGC} * (s_{m,n}) = 20\log_{10}\frac{10^{\frac{A_{des}}{20}} - (1-\lambda)A_{m,n-1}}{\lambda|s_{m,n}|} - G^{LNA} - G^{GCA} \qquad (8)$$

Since $\upsilon$ is assumed to be white Gaussian noise, the value of $\upsilon_{m,n}$ may be unknown before the realization of the noise, and thus $s_{m,n}$ may be unknown. To solve the optimization problem, a predictive model of $s_{m,n}$ may be needed.

ARIMA is a commonly used statistical analysis model to predict future trends of (non-stationary) time series data denoted by $X_t$. In particular, ARIMA may be in the form of following equation (9):

$$\nabla^d X_t = \sum_{i=1}^{p} \alpha_i \nabla^d X_{t-i} + \sum_{j=1}^{q} \beta_i \epsilon_{t-j} + \epsilon_t \qquad (9)$$

The ARIMA model may include an autoregression component parameterized by p that models the dependent relationship between an observation and p lagged observations, an integrated component parameterized by d that represents the d-th order of differences of raw observations to allow the time series to become stationary, and a moving average component parameterized by q that incorporates the dependency between an observation and past zero-mean random noise term $\epsilon_{t-j}$. The order of differencing d required for such model may be chosen based on trends in the data. Next, the order of autoregression p and the order of moving average q may be determined using autocorrelation and partial autocorrelations. Then, the weights ai and Bi may be estimated by maximizing the likelihood. Additionally, the performance of the model fitting data may be verified using residual analysis. In embodiments of the present disclosure, ARIMA may be configured to model the process and predict the signal trends for MPC.

According to various embodiments of the present disclosure, model predictive AGC under AWGN jamming is described hereinafter. Since the model is estimated by fitting data, the sufficiency of the data (i.e., whether the data can fully represent the process of interest) may determine the accuracy of estimated model. To obtain a representative dataset, simulation data may be collected under different realizations of jamming signals and channel noise with various energy per bit to noise power spectral density ratios (Eb/No). For model selection, learning a global model for all scenarios may require a sophisticated model with high complexity and increase the difficulty of optimizing the model. Instead, an accurate local model for each typical scenario is developed, and interpolation of the local models may be configured for fast adaptation of the model for MPC. Furthermore, the scenario herein may refer to a specific configuration of the simulation which may include, but may not be limited to, the types of jamming and anti-jamming techniques.

Prediction horizon may be considered as N=1, as the ARIMA is not suitable at long-term predictions, and a large prediction horizon may significantly increase the computational cost. Then, the optimization problem of the model predictive AGC under jamming at time instant n can be formulated as follows:

$$\min_{G_{m,n}^{AGC}} \mathbb{E}\left[\left\|20\log_{10}\hat{A}_{m,n} - A_{des}\right\|_p^p \,\middle|\, S_{m,n-1}\right] \quad (10a)$$

$$\text{subject to } \hat{A}_{m,n} = (1-\lambda)A_{m,n-1} + \lambda\left|\hat{y}_{m,n}\right| \quad (10b)$$

$$\hat{y}_{m,n} = |\hat{s}_{m,n}|10^{\frac{G^{LNA}+G^{GCA}+G_{m,n}^{AGC}}{20}} \quad (10c)$$

$$\hat{s}_{m,n} = ARIMA(p, q, d)(s_{m,n-p}, \ldots, s_{m,n-1}) \quad (10d)$$

$$0 \le G_{m,n}^{AGC} \le \overline{G}^{GCA} \quad (10e)$$

Based on above-mentioned analysis, the optimal gain may be $$G_{m,n*}^{AGC}(s_{m,n})$$

by substituting $\hat{s}_{m,n}$ into equation (8). However, applying AGC gain values at each time instant may be costly and unstable due to model prediction errors. Instead, the final control law of the developed approach is given as following equation (11):

$$S_{m,n} = \begin{cases} S_q, & |S_q| > \gamma \\ S_i*, & |S_q| \le \gamma \end{cases} \quad (11)$$

where $$S_q = G_{m,n*}^{AGC}\left(\overline{\hat{s}}_{m,n}\right) - G_{m,n-1}^{AGC} \text{ and } \overline{\hat{s}}_{m,n} = \frac{1}{N_p}\sum_{i=1}^{N_p}\hat{s}_{m,i|n-1}$$

is an average of $N_p$ consecutive forecasted responses $\{\hat{s}_{m,i|n-1}|i=1, \ldots, N_p\}$ in the forecast horizon, which may be used to mitigate adverse effect of one-step-ahead forecast errors and consider the long-term trends of signals.

According to various embodiments of the present disclosure, the model predictive AGC scheme may be validated using simulations of the satellite transponder model equipped with HPAs under different noise and jamming levels. In addition, the HPA model based on the extended Saleh's model may be developed. The desired input signal amplitude for HPA may be $A_{des}=-7$ dBm based on the property of HPA for simulation, which may be at −3 dB of the HPA's saturation point. The simulation parameters are summarized in following Table I.

TABLE 1

| Baseband Signal | | IF Band Signal | |
|---|---|---|---|
| Bit Rate | 20 MHz | Center Frequency | 100 MHz |
| Modulation | QPSK | Sampling Rate | 400 MHz |
| Symbol Rate | 10 MHz | | |

Figure 5:
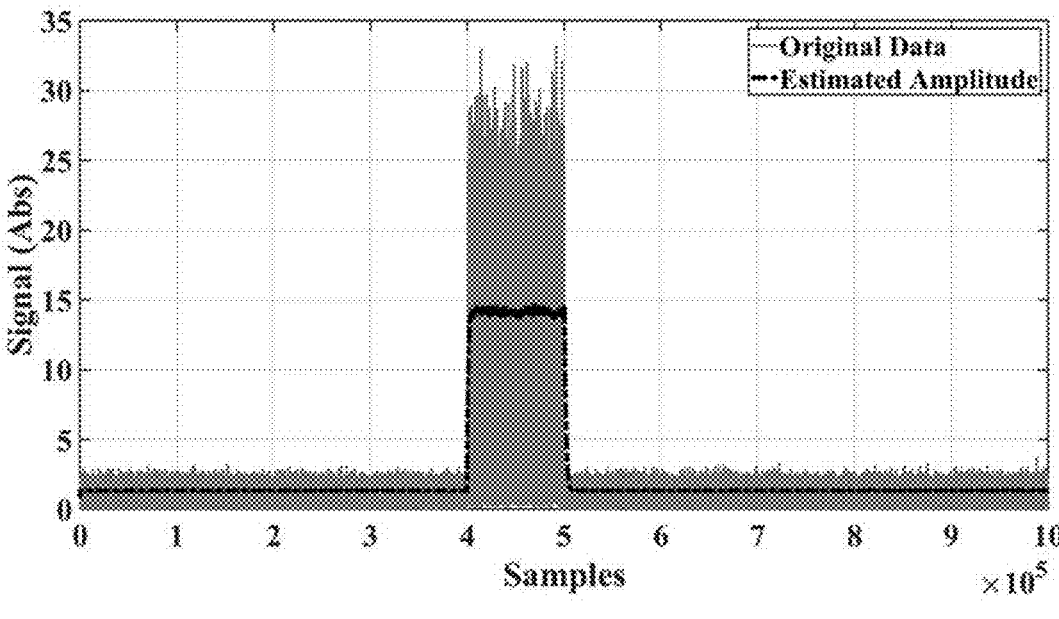
FIG. 5 depicts an exemplary jammed signal with estimated amplitudes when Eb/NO$_{Jam}$=−20 dB for a jamming signal according to various disclosed embodiments of the present disclosure.

In addition to the channel noise, AWGN jamming with energy per bit may be further added to noise power spectral density ratio Eb/NO$_{Jam}$=−20 dB. In one embodiment, the sampling time may be 0.0025 s. FIG. 5 shows an example of a jammed signal with estimated amplitudes. FIG. 5 depicts an exemplary jammed signal with estimated amplitudes when Eb/NO$_{Jam}$=−20 dB for a jamming signal according to various disclosed embodiments of the present disclosure. In one embodiment, jamming may start at the sample #400048 and end at #500168.

For each Eb/No of channel noise, the satellite transponder may be simulated twice without any controller under different realizations of jamming signal and channel noise. The data from one simulation may be used for estimating the ARIMA model, and the other data may be used for testing the model. The econometrics toolbox in MATLAB may be employed to estimate the ARIMA model. The tradeoff between model performance and complexity may be evaluated, and grid search may be used to determine the parameters of the ARIMA model. The determined model may be ARIMA (2, 0, 1). Table 2 shows estimation summary of estimated model for Eb/No=1 dB of the channel noise, which may be configured as an example of the parameter estimates and inferences. In particular, the Value column may contain corresponding maximum-likelihood estimates, and the P Value column may contain p-values for the asymptotic t-test of the null hypothesis that corresponding parameter is 0.

TABLE 2

| | Value | Standard Error | T Statistic | P Value |
|---|---|---|---|---|
| Constant | −0.00047008 | 0.00030452 | −1.5437 | 0.12267 |
| AR{1} | 0.87947 | 0.0030681 | 286.65 | 0 |
| AR{2} | 0.0047483 | 0.00038491 | 12.336 | 5.7873e−35 |
| MA{1} | −0.86968 | 0.0030486 | −285.27 | 0 |
| Variance | 5.4381 | 0.0021791 | 2495.6 | 0 |

The tuning parameters of the MPC-AGC may be determined by simulations as follows: $L=8$, $\lambda=2^{-8}$ $\beta=2^8$ and $N_p=256$. Furthermore, Monte Carlo studies may be employed to compare AGC schemes under different realizations of noise and jamming. In particular, simulations may be run 100 times under different realization of noise and jamming for each Eb/No of channel noise.

Figure 6A:
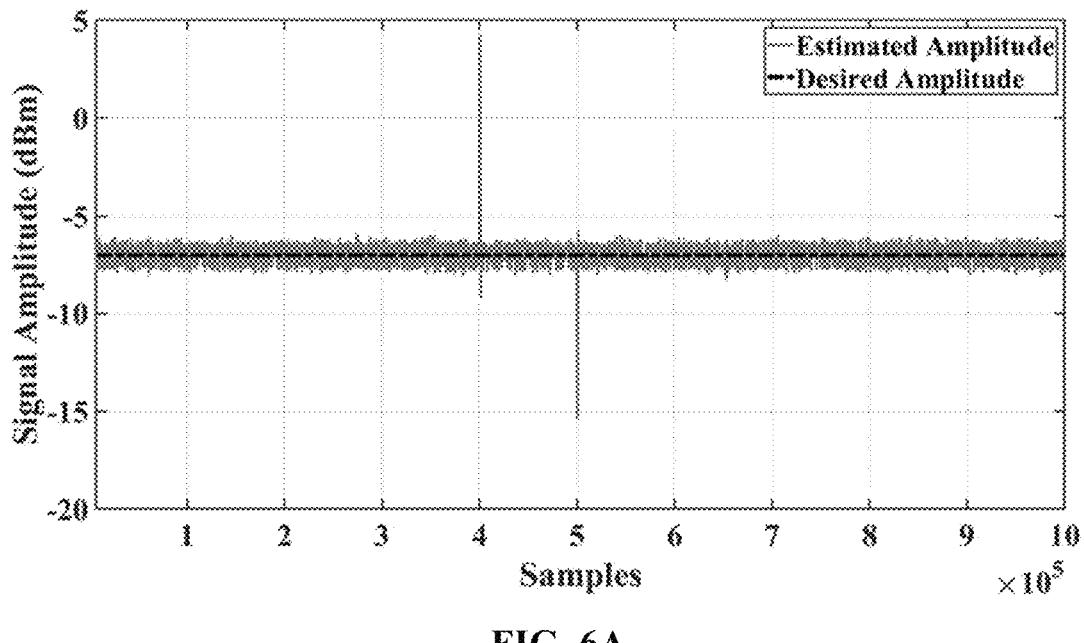
FIG. 6A depicts an exemplary schematic of signal amplitudes using MPC-AGC according to various disclosed embodiments of the present disclosure.
Figure 6B:
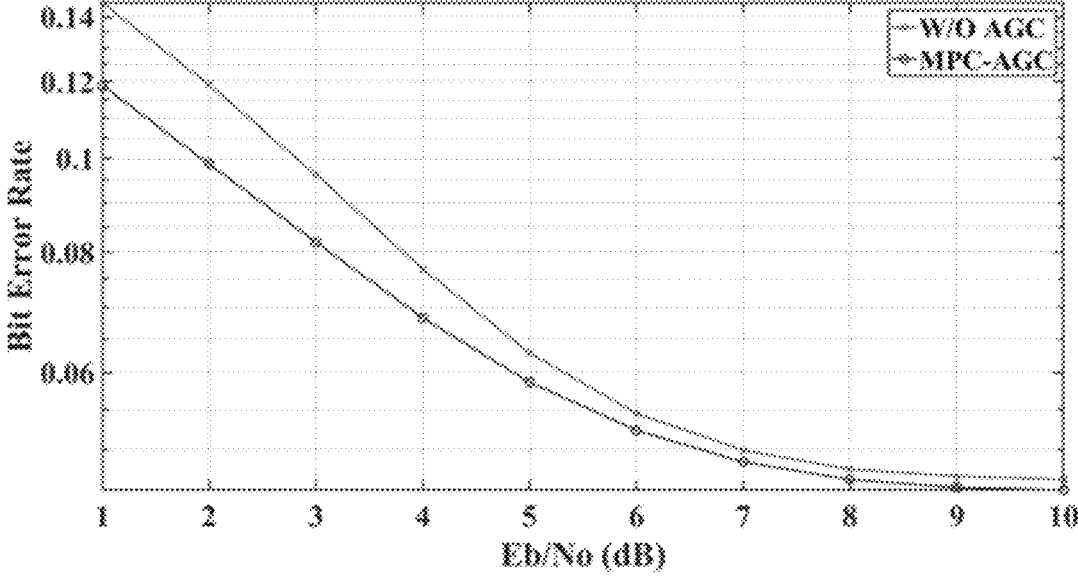
FIG. 6B depicts an exemplary schematic of bit error rates with and without MPC-AGC according to various disclosed embodiments of the present disclosure.

According to various embodiments of the present disclosure, FIG. 6A depicts an exemplary schematic of signal amplitudes using MPC-AGC according to various disclosed embodiments of the present disclosure; and FIG. 6B depicts an exemplary schematic of bit error rates with and without MPC-AGC according to various disclosed embodiments of the present disclosure. FIG. 5A shows that the MPC-AGC maintained the signal amplitude within the tolerance and responded fast to the abrupt changes of the signal amplitude when the jamming started and ended. Moreover, FIG. 5B shows that the MPC-AGC may reduce the BERs, which may justify improving control performance of maintaining desired signal amplitude. In addition, the improvement of BERs by the MPC-AGC may decrease as the Eb/No increases.

Furthermore, in order to demonstrate the control performance of the MPC-AGC, the MPC-AGC may be compared with the SAR-AGC in terms of response time and overshoot/undershoot. The response time may be defined as the number of time instants for the AGC to react to the signal amplitude transients caused by jamming. For example, the response time to the event that the jamming starts may be the period from the time instant when the jamming starts to the time instant after which the amplitude stays within a predefined percentage of the desired amplitude before the jamming ends, and the response time to the jamming ending may be the period from the time instant when jamming stops to the time instant after which the amplitude remains within the percentage of the desired amplitude. In one embodiment, the percentage may be set to 0.1. Table 3 shows response time of AGC schemes for different Eb/No's.

The model predictive AGC scheme is provided to enhance the control performance of maintaining desired signal amplitude and thus decrease the BERs for satellite communications under channel noise and AWGN jamming. In particular, the ARIMA model may be built from data and used for MPC. Simulations on the satellite transponder model may demonstrate that the MPC-AGC may improve the control performance with respect to response time and overshoot/undershoot. Various jamming scenarios may be handled by fitting the ARIMA model to data collected under all kinds of jamming rather than assuming a specific type of jamming. The data-driven approach may be configured for modeling signals under jamming for automatic gain control design. The signal models may be fine-tuned to improve model accuracy and thus signal amplitude control performance. The automatic gain control performance regarding response time and tracking errors may be improved by considering the future trends of signal amplitude rather than based on the current signal amplitude tracking errors. Computationally efficient may be increased by selecting the proper structure of model, and the performance may be improved without significantly increasing the online computational cost. The MPC-AGC may be compatible with existing satellite transponders and automatic gain control without significant adaption cost. The MPC-AGC design may be easily to be updated by simply refining and updating the model using newly collected data and configured for adapting automatic gain controller design to varying jamming.

Various embodiments of the present disclosure provide a system. The system includes a memory, configured to store program instructions for performing a method for model predictive automatic gain control of a satellite transponder under additive white Gaussian noise jamming; and a processor, coupled with the memory and, when executing the program instructions, configured for: predicting a plurality of consecutive signal values by an autoregressive integrated moving average (ARIMA) model using data collected by an antenna receiver in the satellite transponder; calculating a

TABLE 3

| | Eb/No | 1 | 2 | 3 | 4 | 5 | 6 | 7 | 8 | 9 | 10 |
|---|---|---|---|---|---|---|---|---|---|---|---|
| Jamming starts | SAR-AGC | 1774 | 1825 | 1872 | 1894 | 1949 | 1969 | 1997 | 2040 | 2065 | 2095 |
| | MPC-AGC | 1624 | 1615 | 1628 | 1650 | 1679 | 1687 | 1683 | 1721 | 1718 | 1734 |
| Jamming ends | SAR-AGC | 1493 | 1528 | 1554 | 1600 | 1596 | 1629 | 1671 | 1652 | 1688 | 1721 |
| | MPC-AGC | 1483 | 1238 | 1245 | 1289 | 1283 | 1259 | 1249 | 1262 | 1279 | 1273 |

Figure 7:
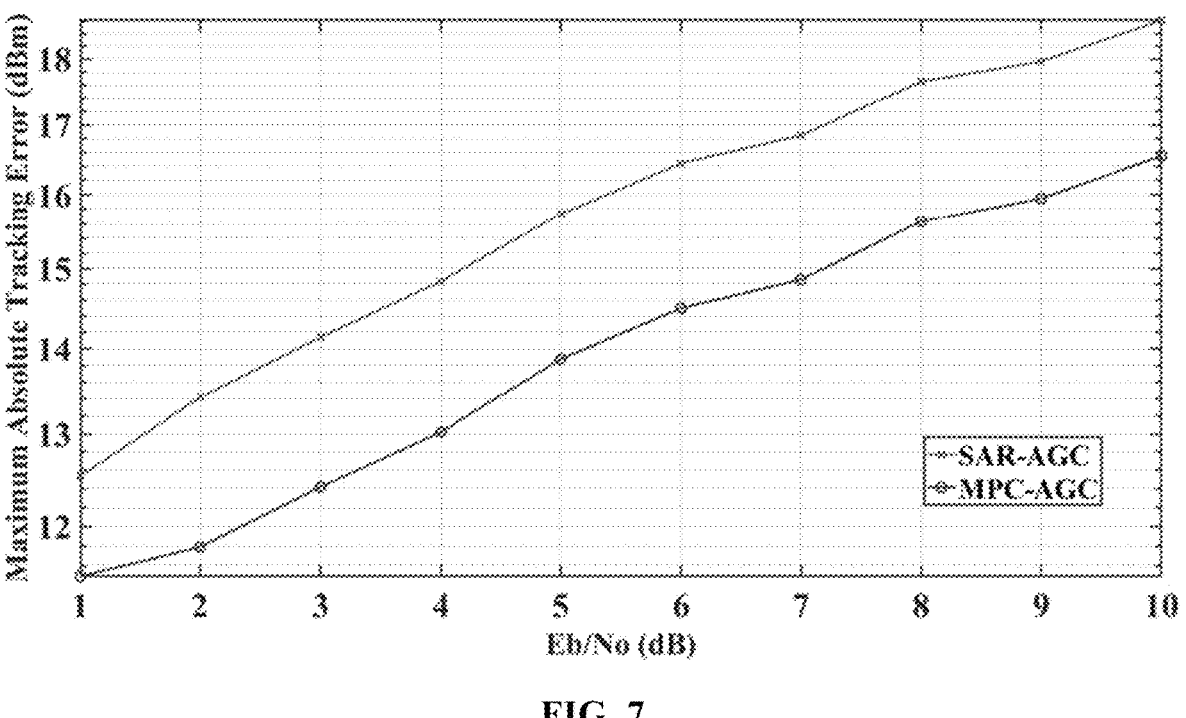
FIG. 7 depicts exemplary comparison of maximum absolute tracking errors between SAR-AGC and MPC-AGC according to various disclosed embodiments of the present disclosure.

According to various embodiments of the present disclosure, Table 3 shows that the MPC-AGC may use less time to respond to the changes in jamming status than the SAR-AGC. The reason for using less time by the MPC-AGC may be that the SAR-MPC may use the ratio of average normalized signal amplitudes of the current and previous blocks of sampled signals to determine control actions without considering future trends of signals while the MPC-AGC may use the forecasted signals to take anticipatory control actions. To compare the overshoot/undershoot, the average of the maximum absolute tracking errors for each Eb/No of the channel noise may be computed. FIG. 7 depicts exemplary comparison of maximum absolute tracking errors between SAR-AGC and MPC-AGC according to various disclosed embodiments of the present disclosure. Referring to FIG. 7, it indicates that the MPC-AGC may achieve less overshoot/undershoot than the SAR-AGC.

From above-mentioned embodiments, it may be seen that at least following beneficial effects may be achieved in the present disclosure.

signal average value of the plurality of consecutive signal values; calculating a gain control value using the signal average value of the plurality of consecutive signal values through a model predictive controller; if the gain control value is greater than a maximum control capability of the AGC, using the gain control value as a desired gain control value, where the maximum control capability is predefined in a lookup table (LUT); or if the gain control value is equal to or less than the maximum control capability, using a minimum difference between an estimated amplitude and each of reference amplitudes in the LUT as the desired gain control value; and calculating a new AGC gain for a current time step according to the desired gain control value and a corresponding AGC gain for a previous time step.

Various embodiments of the present disclosure provide a non-transitory computer-readable storage medium, containing program instructions for, when being executed by a processor, performing a method for model predictive automatic gain control of a satellite transponder under additive white Gaussian noise jamming. The method includes predicting a plurality of consecutive signal values by an autoregressive integrated moving average (ARIMA) model using data collected by an antenna receiver in the satellite transponder; calculating a signal average value of the plurality of consecutive signal values; calculating a gain control value using the signal average value of the plurality of consecutive signal values through a model predictive controller; if the gain control value is greater than a maximum control capability of the AGC, using the gain control value as a desired gain control value, where the maximum control capability is predefined in a lookup table (LUT); or if the gain control value is equal to or less than the maximum control capability, using a minimum difference between an estimated amplitude and each of reference amplitudes in the LUT as the desired gain control value; and calculating a new AGC gain for a current time step according to the desired gain control value and a corresponding AGC gain for a previous time step.

Although some embodiments of the present disclosure have been described in detail through various embodiments, those skilled in the art should understand that above embodiments may be for illustration only and may not be intended to limit the scope of the present disclosure. Those skilled in the art should understood that modifications may be made to above embodiments without departing from the scope and spirit of the present disclosure. The scope of the present disclosure may be defined by the appended claims.

What is claimed is:

1. A method for model predictive automatic gain control (AGC) of a satellite transponder under additive white Gaussian noise (AWGN) jamming, wherein the satellite transponder includes an AGC processor, the method comprising:

predicting a plurality of consecutive signal values by an autoregressive integrated moving average (ARIMA) model using data collected by an antenna receiver in the satellite transponder;

calculating a signal average value of the plurality of consecutive signal values;

calculating a gain control value using the signal average value of the plurality of consecutive signal values through a model predictive controller;

if the gain control value is greater than a maximum control capability of the AGC processor, using the gain control value as a desired gain control value, wherein the maximum control capability is predefined in a lookup table (LUT); or if the gain control value is equal to or less than the maximum control capability, using a minimum difference between an estimated amplitude and each of reference amplitudes in the LUT as the desired gain control value; and calculating a new AGC gain for a current time step according to the desired gain control value and a corresponding AGC gain for a previous time step.

2. The method according to claim 1, before predicting the plurality of consecutive signal values by the ARIMA model using the data collected by the antenna receiver in the satellite transponder, further including:

evaluating accuracy of the ARIMA model by computing mean squared differences between the plurality of consecutive signal values predicted by the ARIMA model and corresponding real signal values.

3. The method according to claim 2, after evaluating the accuracy of the ARIMA model, further including:

if the ARIMA model is accurate, predicting the plurality of consecutive signal values by the ARIMA model; and if the ARIMA model is not accurate, returning to collect new data by the antenna receiver in the satellite transponder.

4. The method according to claim 2, before evaluating the accuracy of the ARIMA model, further including:

fitting the ARIMA model using the data collected by the antenna receiver in the satellite transponder.

5. The method according to claim 1, after calculating the new AGC gain for the current time step according to the desired gain control value and the corresponding AGC gain for the previous time step, further including:

applying the new AGC gain for the current time step and evaluating performance of the model predictive AGC.

6. The method according to claim 5, further including:

if the performance of the model predictive AGC is acceptable, keeping using the model predictive AGC to maintain a signal amplitude at a specified level; and if the performance of the model predictive automatic gain control (AGC) is not acceptable, returning to collect new data by the antenna receiver in the satellite transponder.

7. The method according to claim 1, wherein:

after calculating the new AGC gain for the current time step, the new AGC gain is processed through a gain control amplifier (GCA).

8. A system, comprising:

a memory, configured to store program instructions for performing a method for model predictive automatic gain control (AGC) of a satellite transponder under additive white Gaussian noise (AWGN) jamming, wherein the satellite transponder includes an AGC processor; and a processor, coupled with the memory and, when executing the program instructions, configured for:

predicting a plurality of consecutive signal values by an autoregressive integrated moving average (ARIMA) model using data collected by an antenna receiver in the satellite transponder;

calculating a signal average value of the plurality of consecutive signal values;

calculating a gain control value using the signal average value of the plurality of consecutive signal values through a model predictive controller;

if the gain control value is greater than a maximum control capability of the AGC, using the gain control value as a desired gain control value, wherein the maximum control capability is predefined in a lookup table (LUT); or if the gain control value is equal to or less than the maximum control capability, using a minimum difference between an estimated amplitude and each of reference amplitudes in the LUT as the desired gain control value; and calculating a new AGC gain for a current time step according to the desired gain control value and a corresponding AGC gain for a previous time step.

9. The system according to claim 8, before predicting the plurality of consecutive signal values by the ARIMA model using the data collected by the antenna receiver in the satellite transponder, the processor is further configured to:

evaluate accuracy of the ARIMA model by computing mean squared differences between the plurality of consecutive signal values predicted by the ARIMA model and corresponding real signal values.

10. The system according to claim 9, after evaluating the accuracy of the ARIMA model, the processor is further configured to:

if the ARIMA model is accurate, predict the plurality of consecutive signal values by the ARIMA model; and if the ARIMA model is not accurate, return to collect new data by the antenna receiver in the satellite transponder.

11. The system according to claim 9, before evaluating the accuracy of the ARIMA model, the processor is further configured to:

fit the ARIMA model using the data collected by the antenna receiver in the satellite transponder.

12. The system according to claim 8, after calculating the new AGC gain for the current time step according to the desired gain control value and the corresponding AGC gain for the previous time step, the processor is further configured to:

apply the new AGC gain for the current time step and evaluate performance of the model predictive AGC.

13. The system according to claim 12, the processor is further configured to:

if the performance of the model predictive AGC is acceptable, keep using the model predictive AGC to maintain a signal amplitude at a specified level; and if the performance of the model predictive automatic gain control (AGC) is not acceptable, return to collect new data by the antenna receiver in the satellite transponder.

14. The system according to claim 8, wherein:

after calculating the new AGC gain for the current time step, the new AGC gain is processed through a gain control amplifier (GCA).

15. A non-transitory computer-readable storage medium, containing program instructions for, when being executed by a processor, performing a method for model predictive automatic gain control (AGC) of a satellite transponder under additive white Gaussian noise (AWGN) jamming, wherein the satellite transponder includes an AGC processor, the method comprising:

predicting a plurality of consecutive signal values by an autoregressive integrated moving average (ARIMA) model using data collected by an antenna receiver in the satellite transponder;

calculating a signal average value of the plurality of consecutive signal values;

calculating a gain control value using the signal average value of the plurality of consecutive signal values through a model predictive controller;

if the gain control value is greater than a maximum control capability of the AGC, using the gain control value as a desired gain control value, wherein the maximum control capability is predefined in a lookup table (LUT); or if the gain control value is equal to or less than the maximum control capability, using a minimum difference between an estimated amplitude and each of reference amplitudes in the LUT as the desired gain control value; and calculating a new AGC gain for a current time step according to the desired gain control value and a corresponding AGC gain for a previous time step.

16. The storage medium according to claim 15, before predicting the plurality of consecutive signal values by the ARIMA model using the data collected by the antenna receiver in the satellite transponder, the processor is further configured to:

evaluate accuracy of the ARIMA model by computing mean squared differences between the plurality of consecutive signal values predicted by the ARIMA model and corresponding real signal values.

17. The storage medium according to claim 16, after evaluating the accuracy of the ARIMA model, the processor is further configured to:

if the ARIMA model is accurate, predict the plurality of consecutive signal values by the ARIMA model; and if the ARIMA model is not accurate, return to collect new data by the antenna receiver in the satellite transponder.

18. The storage medium according to claim 16, before evaluating the accuracy of the ARIMA model, the processor is further configured to:

fit the ARIMA model using the data collected by the antenna receiver in the satellite transponder.

19. The storage medium according to claim 15, after calculating the new AGC gain for the current time step according to the desired gain control value and the corresponding AGC gain for the previous time step, the processor is further configured to:

apply the new AGC gain for the current time step and evaluate performance of the model predictive AGC.

20. The storage medium according to claim 19, the processor is further configured to:

if the performance of the model predictive AGC is acceptable, keep using the model predictive AGC to maintain a signal amplitude at a specified level; and if the performance of the model predictive automatic gain control (AGC) is not acceptable, return to collect new data by the antenna receiver in the satellite transponder.

* * * * *